3,109,516
DEVICE FOR SUCCESSIVELY IMMOBILIZING AND RENDERING MOBILE A LOAD DISPLACEABLE WITHIN A CONDUIT

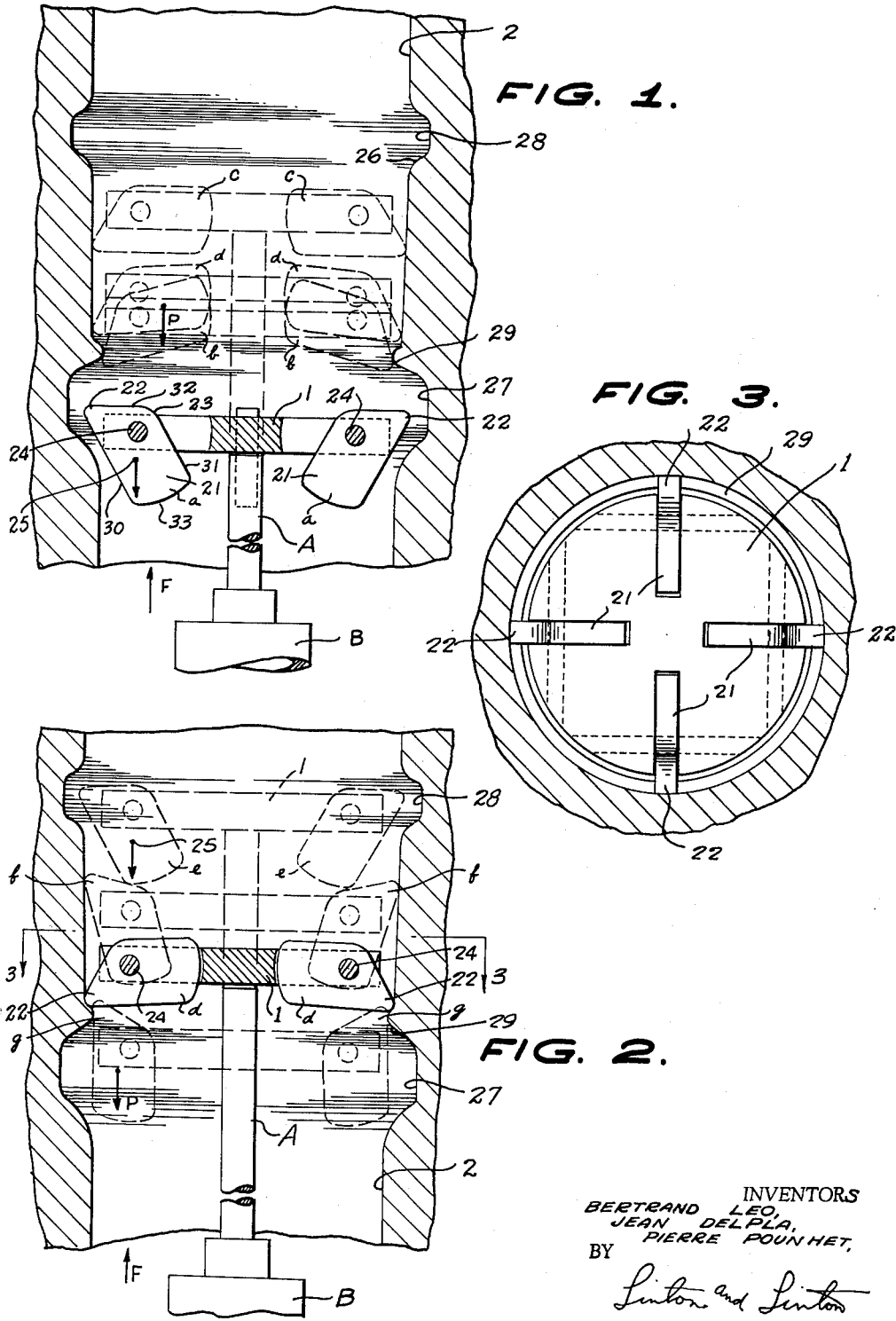

Bertrand Leo and Jean Delpla, Paris, and Pierre Pounhet, Saint-Brice, France, assignors to Electricite de France-Service National, Paris, France, a national French organization
Filed Dec. 2, 1958, Ser. No. 777,713
Claims priority, application France Mar. 6, 1958
1 Claim. (Cl. 187—75)

The present invention is concerned with a device for successively retaining and releasing a load displaceable within a conduit.

Our present invention has for its object a device for successively immobilizing and then rendering mobile a load displaceable within a conduit, in which a movable member is articulated on to the load or on to the loading platform, while grooves separated by an annular ridge are provided in the conduit for cooperating with said movable member with the axial lengths of these two grooves and of this ridge relative to the conduit, as well as the distances which separate them from one another, capable of being established independently of the shapes and dimensions of the movable member.

Further characteristics of our invention will become apparent from the following description, taken in conjunction with the accompanying drawing, which is given by way of example only and not in any limiting sense.

In these drawings,

FIG. 1 is a cross-sectional view of one embodiment of the invention, the movable member being illustrated in the successive positions which lead up to immobilization.

FIG. 2 is a similar view showing the various positions occupied by the movable member during the load-shifting operation.

And FIGURE 3 is a cross-sectional view taken on line 3—3 of FIGURE 2.

As shown in this drawing, each movable member 21 having two sides 30 and 31 contiguous with two ends 32 and 33 with side 30 and end 32 providing a corner having an acute angle 22 and side 31 and end 32 providing a corner having an obtuse angle 23. The portion 22, in particular, forms the locking member, this movable member being pivoted on to platform 1 by the axle 24 which is located in the vicinity of the obtuse angle 23. Now if 25 be the designation for the center of gravity of this movable member mounted freely on the axle 24, then the action of gravity will cause the member to adopt the position shown at $a$. The platform 1 may include a plurality of such movable members.

On the wall 26 of the conduit 2 are provided two grooves 27 and 28 and a ridge 29, with these grooves and this ridge being provided either all the way round said conduit, or else only at those parts thereof facing the movable members, as exemplified by 21.

Assuming it is desired to immobilize a load in the conduit, this load is displaced by any appropriate means such as the piston rod A of a hydraulic lift B, for example, in the direction of the arrow F. Opposite the groove 27, the member 21 adopts a natural position of equilibrium as shown at $a$. On passing in the front of the ridge, the claw 22 is thrust downwards and the movable member takes up the position $b$, which it retains substantially up to $c$.

It will be easily appreciated that, under such conditions, if the loading platform is lowered once more by the effect of gravity, the position of the movable member will remain unchanged, since the latter bears against the wall of the conduit under the effect of the moment exerted by the weight $p$ of the movable member about the axle 24. When the movable member reaches the position $d$, the claw 22 abuts against the ridge 29 and arrests the platform. The movable member accordingly acts after the manner of a quoin.

Assuming now that it is desired to move the load from the position $d$ (FIG. 2) shown here in solid lines, then all that is required is to shift the loading platform up to the position $e$ in which the claw 22 is located opposite the groove 28, whereupon the member 21 readopts its natural position of equilibrium, so enabling the platform either to be raised still further or to be lowered once more with the movable member successively taking up the positions $f$ and $g$, the latter of which is its position at the moment of crossing the ridge 29, and returns finally to the position $a$ wherefrom the platform may, of course, resume its descending movement.

It will be appreciated that the member 21, by virtue of its shape, is extremely strong, enabling relatively big loads to be immobilized.

The present device can be employed, for example, in an atomic pile with conduit 2 representing one of the conduits in such a pile modified for the present operation. However, it is to be appreciated that conduit 2 can equally as well be employed in various other devices as desired.

It is to be clearly understood that our invention is by no means limited to the specific embodiment described hereinbefore with reference to the accompanying drawings which is given by way of example only and not in any limiting sense, but that on the contrary many detail modifications may be made without departing from the scope of the invention.

What we claim is:

A device for successively locking and releasing a load displaceable within a conduit comprising a conduit having a longitudinally extending inner side wall, a load supporting platform movably positioned in said conduit and capable of being moved longitudinally of said conduit, means for shifting said platform longitudinally of said conduit, at least one moving member having two sides contiguous with two ends and with one of said ends and a side forming a corner having an acute angle and said end and another side forming a corner obtuse angle, means pivotally connecting said moving member adjacent said corner having an acute angle to said platform with said member end slidingly contacting said conduit inner side wall, said member being free to pivot about said pivotal connection to said platform, said conduit inner side wall having a pair of grooves extending laterally of said conduit of a configuration permitting said moving member to pivot freely about its pivotally connecting means and a ridge on said conduit inner side wall between said grooves for being contacted by said movable member acute angle corner upon movement of said platform and retaining said platform against movement in one direction when moving in that direction.

References Cited in the file of this patent

UNITED STATES PATENTS

| | | |
|---|---|---|
| 470,730 | Welter | Mar. 15, 1892 |
| 663,582 | Robbin | Dec. 11, 1900 |
| 733,907 | Hanson | July 14, 1903 |
| 736,474 | Baker | Aug. 18, 1903 |
| 2,196,779 | Persson | Apr. 9, 1940 |